Aug. 4, 1959 K. BREGENZER 2,897,651
HYDRAULIC FEED CONTROL FOR PROFILING MACHINES AND THE LIKE
Filed Dec. 20, 1955 2 Sheets-Sheet 2
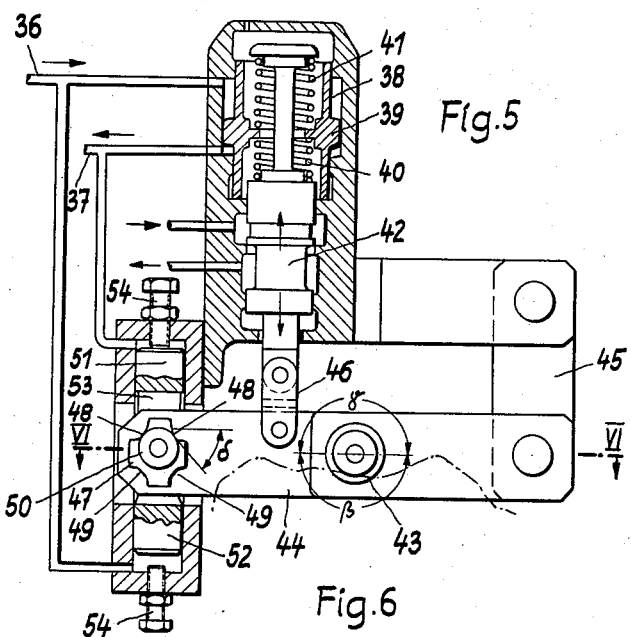
Fig.5
Fig.6
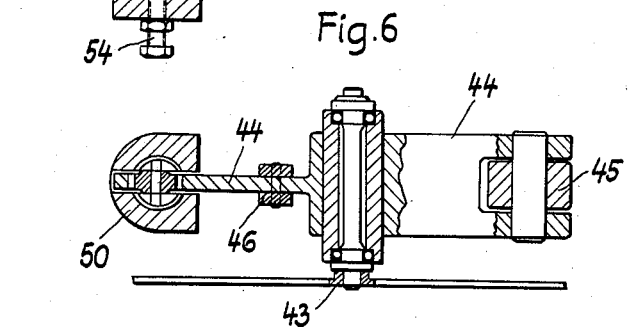
Fig.7
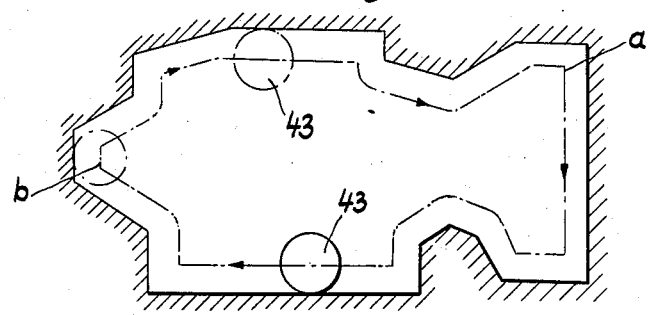
INVENTOR.
Kurt Bregenzer
BY
Michael S. Striker United States Patent Office 2,897,651
Patented Aug. 4, 1959

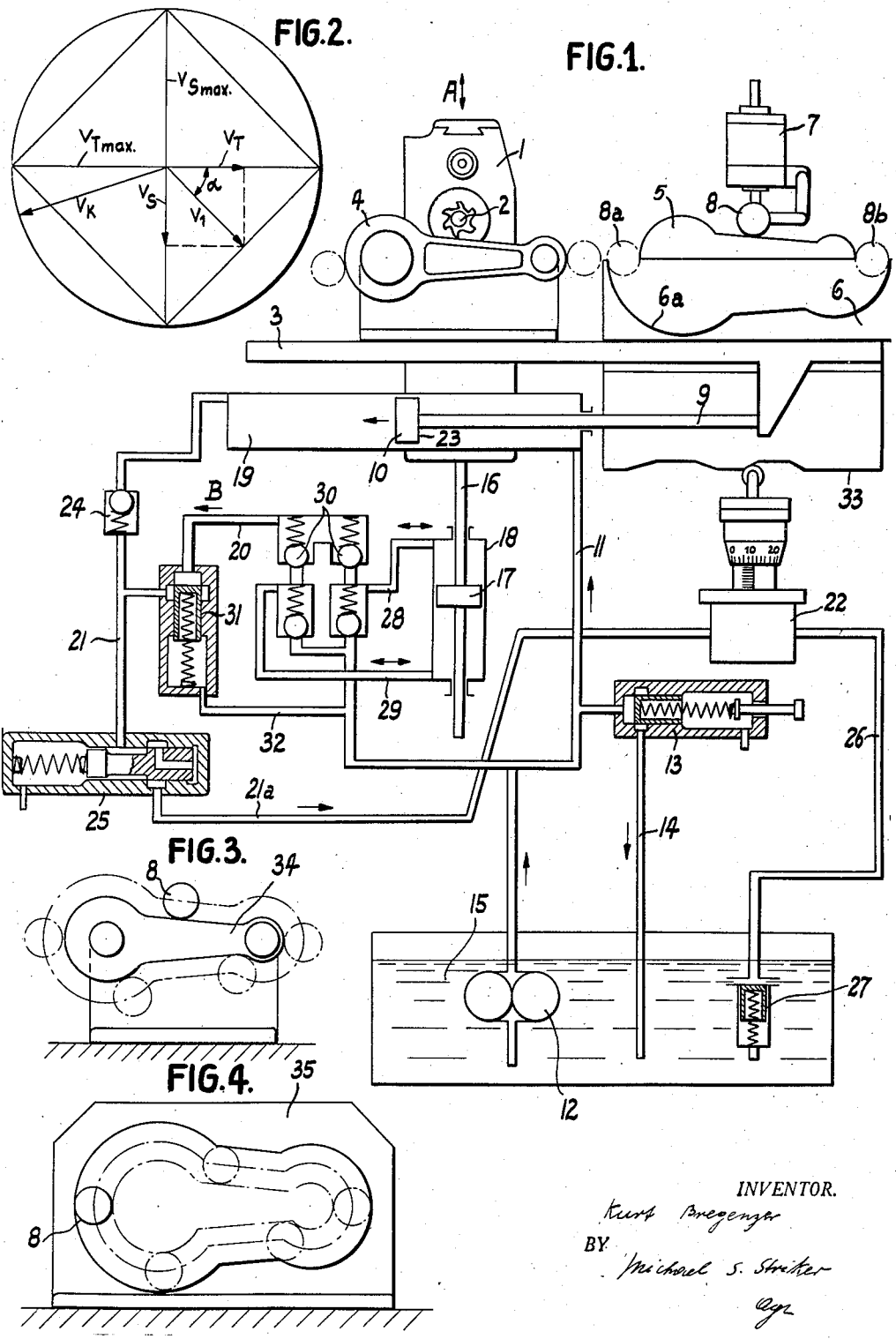

2,897,651

HYDRAULIC FEED CONTROL FOR PROFILING MACHINES AND THE LIKE

Kurt Bregenzer, Ulm (Danube), Germany, assignor to Fritz Kopp, Ulm (Danube), Germany Application December 20, 1955, Serial No. 554,354

Claims priority, application Germany December 24, 1954

7 Claims. (Cl. 60—97)

The invention relates to an automatic hydraulic feed control for profiling machines, copying lathes and the like, using a laterally sensitive feeler valve for controlling the vertical movement of the spindle head (profiling or copying movement).

Hydraulically controlled profiling machines are known which substantially are only suitable for longitudinal profiling up to a slope of about 70°. In a profiling machine of this type, two separate controls are provided, namely, a copying template which only controls the vertical spindle head feed through a feeler or tracer valve and a second template which controls the table feed by means of a feeler and control member.

The invention is based on the principle of so coupling the hydraulic controls for the feeding movements of the spindle head and table that the table feed is dependent on that of the spindle head, and therefore the separate control of the table feed with the use of a separate template is disposed with. This coupled control is to be so arranged that the resultant total feed of the spindle head and milling table remains substantially constant. The hydraulic feed control according to the invention for profiling machines and the like is so designed that the liquid displaced by that piston of the table feed cylinder which is acted upon by a constant pressure and the liquid displaced by an auxiliary piston coupled to the spindle head are fed by way of a common feed pipe to a flow governor which permits the passage of a certain adjustable amount of liquid per unit of time so that the sum of the feeding movements of the milling table and the spindle head remains constant.

With this novel hydraulic feed control, the table feed is therefore controlled in dependence on the movement on the spindle head, in which the feed set at the flow governor corresponds to the sum of the feeding movements of the milling table and spindle head. With the novel hydraulic feed control, it is possible with a suitable tracer or feeler device to copy curves with steps of up to ±90° slope. In a further development of the hydraulic feed control according to the invention, this control also permits a profiling or copying of closed curves.

The invention is hereinafter more fully explained by reference to embodiments illustrated in the accompanying drawings in which:

Figure 1 shows in diagrammatic form a hydraulic feed control according to the invention for a profiling machine;

Figure 2 is a feed diagram for the machine of Figure 1;

Figures 3, 4 and 7 show different forms of copying templates for use with the machine of Figure 1;

Figure 5 is a vertical section through a feeler or tracer valve suitable for use in the hydraulic feed control of the invention; and Figure 6 is a section taken on the line VI—VI of Figure 5.

Referring to Figure 1 of the drawings, 1 represents the spindle head of a profiling machine, 2 is the milling spindle and 3 is the milling table on which the workpiece is clamped as indicated at 4. The upward and downward movement A of the spindle head is controlled by fixedly arranged copying templates 5 and 6 which are explored with a laterally sensitive feeler or tracer valve 7 carrying a feeler roller 8. This valve controls the hydraulic drive of the spindle head, this drive not being shown. The control diagram shown in Figure 1 only contains those control elements which take part in the driving of the milling table and in the automatic feed regulation. The table-reversing members are omitted for enabling the drawing to be better understood, and the drawing also does not contain the details of the vertical feeler device 7, which may operate according to different systems (hydraulical or electrical) and copies up to a slope of ±90°.

A piston 10 connected by a piston rod 9 to the milling table 3 is provided for driving the latter, the piston 10 being acted upon by constant hydraulic pressure delivered by a gear pump 12 through a pipe line 11. This pressure is adjusted by means of a maximum pressure valve 13, any excess amount of oil delivered by the gear pump flowing back by way of the valve 13 and a pipe line 14 into the oil reservoir 15.

An auxiliary piston 17 connected to the spindle head 1 by a piston rod 16 is also provided, this piston being arranged in a cylinder 18. As will be seen from Figure 1 both the liquid displaced by the table feed piston 10 from the cylinder space 19 and the liquid displaced by the auxiliary piston 17 are expelled into a pipe line 20 are forced into a common collecting pipe 21, 21a and are supplied by this latter pipe to a flow governor 22 which permits only a predetermined adjustable amount of liquid to pass through per unit of time. Due to this coupling of the feeds of the spindle head and table, the sum of the feeds of the milling table and spindle head is positively kept constant.

The operation of the automatic feed control shown in Figure 1 is as follows:

The full pressure of the gear pump 12, which is adjusted by the valve 13, acts against the surface 23 of the piston 10 for the table feed. The amount of oil expelled from the cylinder space 19 is circulated by way of a non-return valve 24 into a common return pipe line 21, in which a pressure-reducing valve 25 is interposed for reducing the pressure in the pipe line 21a to a constant value of for example 3 atmospheres in order to increase the metering accuracy or constancy of the flow governor 22. The oil flows from the latter through a pipe 26 into the oil reservoir 15 and is given a small bias by a back-pressure valve 27 in order to stabilise the pressure drop at the flow governor 22. This oil circulation exists as long as the spindle head 1 is stationary, that is to say, while a horizontal line is being traced. However, if the spindle head is now controlled in an upward or downward direction by the template 5, 6, the table feed must become correspondingly slower. This is effected by means of the piston 17, which is connected to the spindle head and by which the amount of oil displaced thereby between the non-return valve 24 and the pressure-reducing valve 25 is forced into the common return pipe 21. This additional amount of oil must also flow through the flow governor 22 so that consequently the table-feed piston 10 can expel less oil and thus the table feed becomes correspondingly slower. With a slope angle of 90° of the templates 5, 6, the non-return valve 24 prevents the milling table being forced backwardly by the oil quantity displaced by the auxiliary piston 17. The cylinder 18 of the auxiliary piston is so connected by way of pipes 28 and 29 to the non-return valve 30 that the oil quantity displaced by the piston 17 in both the upward and the downward movements always flows in the direction B in the pipe 20. Connected to the pipe 20 is a differential pressure valve 31 which serves to reduce the pressure difference between the pressures acting on the two sides of the auxiliary piston 17. This differential pressure valve therefore serves the purpose of keeping as small as possible the amount of force applied for actuating the auxiliary piston 17. This differential pressure on the auxiliary piston 17 or between the pipes 20 and 32 is for example only about 0.5 atmosphere.

According to a feature of the invention, there is also provided a supplementary feed template 33 which is connected to the milling table 3 and acts on the flow governor 22 to vary the flow quantity in the pipe 21a. By means of this supplementary template 33, it is possible to modify the degree of feed during the milling operation in order to be able to adapt it to the particular cutting conditions of the milling tool. This supplementary modification of the feed is for example desirable when the quantity of chips or swarf is changed or when a particular surface quality is required at certain points on the surface being machined.

The flow governor, which may be of various constructions, must be so designed that it always delivers or allows the flow of the same amount of liquid per unit of time, it being possible for this flow quantity to be adjustable. The infinitely variable measuring pump described in German patent specification No. 890,600 can with advantage be employed as the flow governor 22. As is shown in the latter patent the flow governor includes a stationary cylinder in which a floating piston reciprocates to discharge a predetermined amount of liquid during each of its strokes. The discharge from this cylinder is the conduit 26. The reciprocation of the floating piston is effected by a slide valve assembly which receives the fluid under pressure from the conduit 21a. This slide valve assembly acts to admit the liquid under pressure first to one side and then to the other side of the floating piston so that the latter continuously reciprocates back and forth at a predetermined rate to discharge only a given amount of fluid per unit of time. The extent to which the floating piston reciprocates is regulated by an adjustable stop structure so that the amount of fluid which flows per unit of time to the reservoir 15 can be regulated.

The operation of the automatic hydraulic feed control shown in Figure 1 can be seen from the diagram of Figure 2. The total feed adjustable in the measuring pump 22 is designated by $v_K$. If the spindle head movement is zero a maximum table feed $v_{Tmax}$ is produced which corresponds to the feed $v_K$. At an angle $\alpha$, which is assumed by way of example to be 45° in Figure 2, a resultant feed $v_1$ is produced, which corresponds to a table feed $v_T$ and a spindle head feed $v_S$. It is clear from the diagram of Figure 2 that in every case the sum of the table feed $v_T$ and spindle head feed $v_S$ always corresponds to the constant value $v_K$.

When using a feeler valve 7, which is laterally sensitive and when two separate templates 5 and 6 are provided, it is possible by means of the arrangement according to the invention to mill closed curves by the copying method. As will be seen, the template 5 is provided for milling the upper half of the curve of the workpiece 4, which template conforms to the curve which is to be milled, while the template 6 is used for milling the bottom half of the curve of the workpiece and the curved track 6a of this template 6 is enlarged by the diameter of the feeler or tracer roller 8. The template 5 serves for the copying operation during one movement of the table, while the template 6 becomes operative when the table movement is reversed. The position of the roller 8 at the end positions of the table (reversal positions) is indicated in broken lines at 8a and 8b.

Where closed curves are to be copied with the automatic feed control of Figure 1, and using a single template, for example a template 34 (Figure 3) or template 35 (Figure 4) it is necessary to use a specially designed feeler valve which is shown by way of example in Figures 5 and 6, in which two pipes 36 and 37 serving for the reversal of the table movement in the end positions are connected to a cylinder 38, containing a piston 39 to which fluid is admitted on two sides, this piston acting by means of a double spring 40, 41 on the control valve piston 42 of the feeler or tracer valve.

In the position of the parts shown in Figure 5, it is assumed that the pipe 36 is the pressure pipe and the pipe 37 is the discharge pipe. Consequently, the piston 39 is forced downwardly, so that the spring 40 is tensioned and urges the control valve piston 42 downwardly, so that consequently the tracer roller 43 is urged from above on to the copying template and the said roller is effective in the angular range of $\beta$. When the movement of the table is reversed, the pipe 37 becomes the pressure pipe and the pipe 36 becomes the discharge pipe, so that in this case the piston 39 is forced upwardly and tensions the spring 41, this forcing the tracer roller 43 upwardly against the copying template so that the roller is then able to operate in the angular range of $\alpha$.

In the preferred construction illustrated in Figures 5 and 6 the feeler or tracer roller 43 is mounted on a horizontal lever 44, which has a floating suspension at one end by means of a link 45 and is connected by a short link 46 to the control valve piston 42. Formed at the other end of the lever 44 is a cut-out 47 with two pairs of symmetrically arranged bevelled surfaces 48 and 49, of which always the two upper surfaces 48 or the two lower surfaces 49 cooperate with a guide roller 50. The latter is mounted on a reversing piston, the cylinder of which is connected to the table-reversing pipes 36 and 37. This reversing piston is preferably in the form of a double-piston 51, 52 and the neck 53 of this piston is provided with a longitudinal slot in which the guide roller 50 is mounted and in which at the same time the lever 44, including the bevelled surfaces 48 and 49 is freely displaceable, as will be seen from Figure 6. If the feeler roller 43 is urged from above on to the copying template, the pressure of the control pipe 36 acts at the same time on the piston 52, so that the guide roller 50 is disposed in its upper position. When reversal of the table takes place, the double piston 51, 52 and thus the guide roller 50 is moved downwardly, so that the latter now cooperates with the bottom bevelled surfaces 49. The stroke of the reversing piston 51, 52 can be accurately adjusted by two setting screws 54.

It is clear from Figure 5 that because of the arrangement of the bevelled surfaces 48, 49 and the guide roller 50, the control valve piston 42 of the feeler valve responds at all inclinations of the copying template up to ±90°, i.e., in the angular range $\beta$ or the range $\alpha$, that is to say, is raised or lowered even with forces acting obliquely on the feeler roller. If for example a closed curve such as defined by the template shown in Figure 7 is to be copied, the feeler roller 43 travels in one movement of the table from the position $a$ as far as the position $b$. During this movement the control pipe 36 is under pressure and the pipe 37 is connected to discharge and the feeler roller is urged against the template from above by means of the tensioned spring 40. Each action of the copying template on the feeler roller within the angle $\beta$ produces a control movement of the feeler valve piston 42 in its longitudinal direction through the guide roller 50.

The reversal of the table movement and tracing direction takes place at the point $b$, so that the pipe 37 is now the pressure pipe and the pipe 36 is the discharge pipe. The vertical copying movement is not modified thereby. The feeling or tracing range of the valve is now displaced by 180° and is within the angle $\alpha$. The guide roller 50 now bears on the lower bevelled surfaces 49 and the piston 39 now produces an upwardly acting pressure of the tracer roller 43 through the top compression spring 41, so that the copying can take place from $b$ to $a$ along the upper surface of the template.

The transmission from the tracer roller to the valve piston 42 can be adjusted by varying the angle α of the surfaces 48 and 49 by employing levers 44 of different lengths.

What I claim is:

1. A hydraulic control circuit for a profiling machine having a work carrier and a tool carrier movable in mutually perpendicular directions, said circuit comprising, in combination, a first cylinder and a first piston slidable therein for displacing a hydraulic liquid therefrom, said first piston being adapted to be connected with one of the machine carriers for movement therewith; a second cylinder and a second piston slidable therein for displacing a hydraulic liquid therefrom, said second piston being adapted to be connected with the other of the machine carriers for movement therewith; first conduit means leading from said first cylinder for receiving the liquid displaced therefrom by said first piston; second conduit means leading from said second cylinder for receiving the liquid displaced therefrom by said second piston; third conduit means communicating with said first and second conduit means for receiving therefrom the liquid displaced from both of said cylinders; and flow control means connected with said third conduit means for limiting the rate of liquid flow therethrough.

2. A circuit as recited in claim 1 and wherein the rate of liquid flow through said third conduit means is maintained substantially constant by said flow control means.

3. A circuit as recited in claim 1 and wherein said flow control means is adjustable for adjusting the rate of liquid flow through said third conduit means.

4. A circuit as recited in claim 3 and wherein an automatic adjusting means cooperates with said flow control means for automatically adjusting the same.

5. A circuit as recited in claim 1 and wherein a pressure-reducing valve means is connected with said third conduit means upstream of said flow control means for maintaining the liquid which reaches said flow control means at a substantially constant pressure.

6. A circuit as recited in claim 1 and wherein a pressure-equalizing means cooperates with one of said cylinders for maintaining the liquid at opposite sides of the piston therein at substantially the same pressure.

7. A circuit as recited in claim 1 and wherein a back-pressure valve means is connected with said third conduit means downstream of said flow control means for stabilizing the pressure drop therethrough.

References Cited in the file of this patent

UNITED STATES PATENTS

| | | |
|---|---|---|
| 2,374,714 | Turchan et al. | May 1, 1945 |
| 2,391,492 | Turchan et al. | Dec. 25, 1945 |
| 2,706,892 | Fritschi et al. | Apr. 26, 1955 |
| 2,723,598 | Mann | Nov. 15, 1955 |
| 2,761,356 | Scherrer | Sept. 4, 1956 |